(12) United States Patent
Roosen et al.

(10) Patent No.: US 6,239,371 B1
(45) Date of Patent: May 29, 2001

(54) CABLE SPLICE CLOSURE

(76) Inventors: Dirk Roosen, Meendijk 50, B-3300, Tienen; Daniele Scapicchio, Hollestraat 3, B-3290, Diest, both of (BE)

(*) Notice: Subject to any disclaimer, the term of this patent is extended or adjusted under 35 U.S.C. 154(b) by 0 days.

(21) Appl. No.: 09/297,594

(22) PCT Filed: Nov. 7, 1997

(86) PCT No.: PCT/GB97/02989
§ 371 Date: May 3, 1999
§ 102(e) Date: May 3, 1999

(87) PCT Pub. No.: WO98/20591
PCT Pub. Date: May 14, 1998

(30) Foreign Application Priority Data

Nov. 7, 1996 (GB) .................................................. 9623230

(51) Int. Cl.⁷ .................................................. H02G 3/18
(52) U.S. Cl. ..................... 174/65 R; 174/155; 174/156; 174/93
(58) Field of Search ............................. 174/65 R, 65 G, 174/92, 93, 155, 156

(56) References Cited

U.S. PATENT DOCUMENTS

| | | | |
|---|---|---|---|
| 4,492,816 | 1/1985 | Morel et al. | 174/92 |
| 4,538,021 | * 8/1985 | Williamson, Jr. | 174/92 |
| 4,558,174 | * 12/1985 | Massey | 174/92 |
| 4,711,975 | 12/1987 | Morel et al. | 174/92 |
| 6,107,571 | * 8/2000 | Damm | 174/74 R |

FOREIGN PATENT DOCUMENTS

| | | |
|---|---|---|
| 72 15 331 | 7/1972 | (DE) . |
| 0 503 463 A1 | 4/1992 | (EP) . |
| 2061025 | 5/1981 | (GB) . |
| WO 95/33294 | 12/1995 | (WO) . |

* cited by examiner

Primary Examiner—Dean A. Reichard
Assistant Examiner—Charlie Nguyen
(74) Attorney, Agent, or Firm—Myers Bigel Sibley & Sajovec

(57) ABSTRACT

A cable splice closure is provided including first and second casing parts, opposing edges of which may be brought together to close the closure, and a series of protrusions extending along the exterior of the first casing part adjacent to the edge of the first casing part. Also included are a series of openings extending adjacent the edge of the second casing part in an extending wall which, when the closure is closed, overlaps the exterior of the first casing part such that each protrusion is resiliently interlocked with a respective opening. The second casing part further includes a plurality of apertures in its extending wall for receiving a lever to force the casing parts together such that the respective protrusions and openings interlock and to force the casing parts apart such that the respective protrusions and openings disengage.

22 Claims, 3 Drawing Sheets

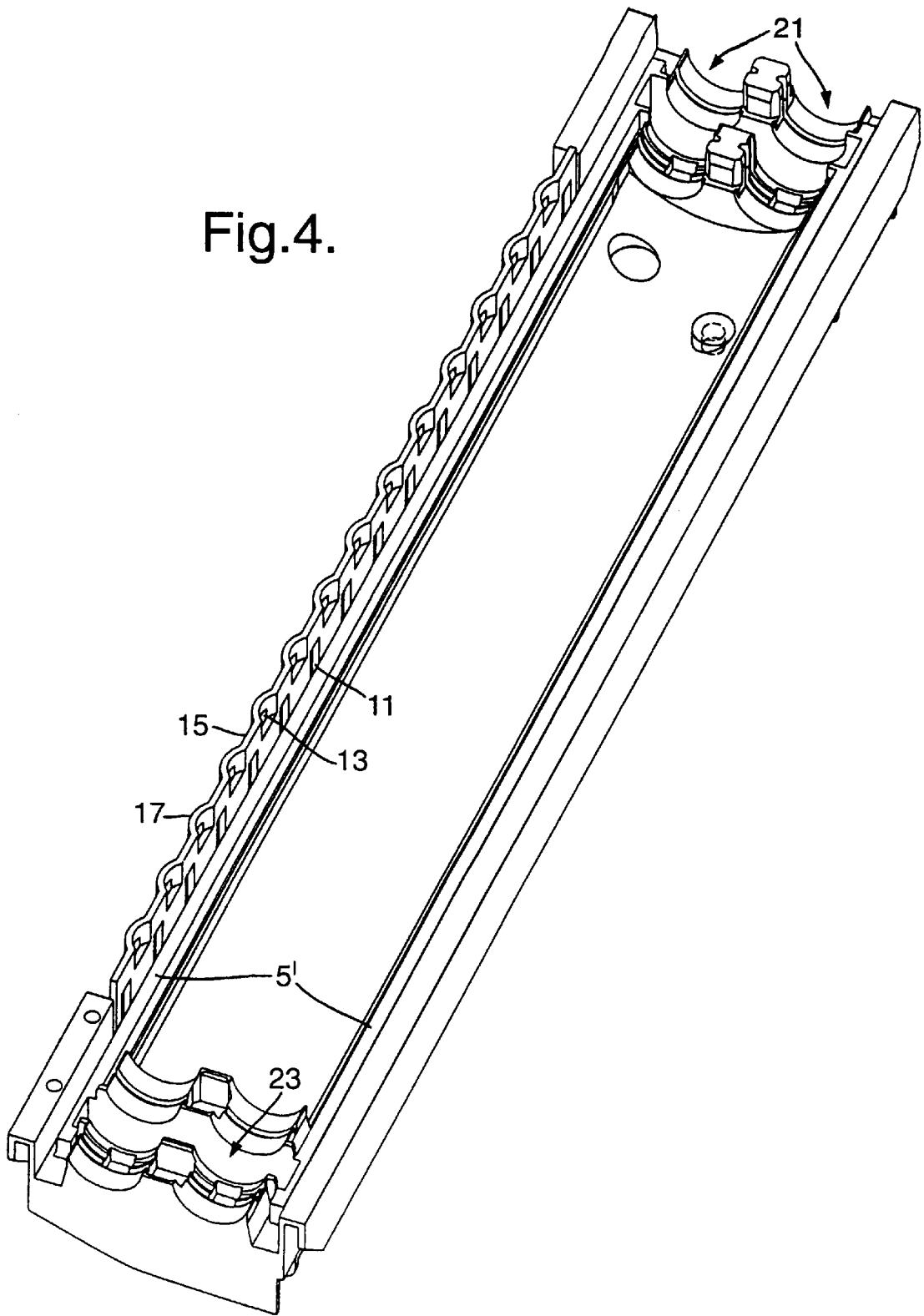

CABLE SPLICE CLOSURE

FIELD OF THE INVENTION

The present invention relates to cable splice closures, e.g. for telecommunications cables.

BACKGROUND OF THE INVENTION

U.S. Pat. Nos. 4,711,975 and 4,492,812 each disclose cable splice closures in which casing half-shells are fastened together by means of interlocking protrusions and apertures arranged along opposing edges of the half-shells. Cable splice closures as disclosed in these two patents suffer from the disadvantage that they are generally difficult to open and close.

According to the present invention, there is provided a cable splice closure, comprising first and second casing parts, opposing edges of which may be brought together to close the closure, a series of protrusions extending along the exterior of the first casing part adjacent to a said edge, and a series of openings extending adjacent to a said edge of the second casing part in an extending wall which, when the closure is closed, overlaps the exterior of the first casing part such that each protrusion is resiliently interlocked with a respective opening, characterised in that the second casing part includes a plurality of apertures in its extending wall for receiving a lever to force the casing parts together such that the respective protrusions and openings interlock and/or to force the casing parts apart such that the respective protrusions and openings disengage.

The cable splice closure according to the invention has the advantage that it is normally easier to open and close than the known closures, because the second casing part includes apertures in its extending wall which permit the use of a lever (e.g. a screwdriver or the like) to force the casing parts together and/or apart. The known closures do not have this advantage, so they must normally be opened and closed by hand, without the use of tools.

In preferred embodiments of the invention, each aperture extends completely through the extending wall from an exterior surface to an interior surface of the wall, thereby permitting a lever to be inserted through the aperture from the exterior surface of the wall and into engagement with the exterior of the first casing part, in order to force the casing parts together. Preferably, the exterior of the first casing part includes at least one shoulder arranged to be engaged by a lever received in an aperture when the casing parts are being forced together.

Additionally or alternatively, each aperture preferably comprises a recess in an interior surface of the extending wall which is open to a front edge of the wall, thereby permitting a said lever to be inserted between the extending wall and the exterior of the first casing part, in order to disengage respective said protrusions and openings when they are interlocked in use.

Preferably the apertures in the extending wall are arranged in a series along the wall. Advantageously each aperture may be associated with a respective opening, or a respective pair of openings, for example. Each aperture is preferably situated between at least one respective opening in the extending wall and the front edge of the wall. Additionally or alternatively, each aperture may be situated between a respective pair of openings in the extending wall.

The first and second casing parts preferably comprise half-shells. In some preferred embodiments, the first and second casing parts are completely separable from one another, e.g. having two pairs of opposing edges which are substantially parallel to the direction in which cables extend into the closure in use. In other embodiments, the first and second casing parts are hinged together, e.g. having only one pair of opposing edges, which are substantially parallel to the direction of the cables. The casing parts are preferably formed from a polymer, e.g. polyethylene or polypropylene.

Each pair of opposing edges is preferably sealed, in use, by means of at least one sealing member. The or each sealing member is preferably resilient, e.g. having a low compression set. The compression set of the material of the sealing member(s) is preferably no greater than 40%, more preferably no greater than 30%, as measured according to ISO 815, i.e. 50% compression strain at 70° C. for 22 hours, measured after a recovery time of 30 minutes.

The resilience and low compression set of the preferred sealing member(s) have the advantage that they contribute to the maintenance of a good seal over time. Additionally, they may also have the advantage of facilitating the opening of the closure, by pushing the two casing parts apart as the protrusions and openings are disengaged from each other.

The or each sealing member is preferably hollow, e.g. generally tubular and/or formed from a foam material. The material of the sealing member(s) is preferably polymeric, e.g. elastomeric. A particularly preferred material is natural or synthetic rubber, e.g. a silicone or EPDM rubber.

BRIEF DESCRIPTION OF THE DRAWINGS

The invention will now be described, by way of example, with reference to the accompanying drawings, of which:

FIG. 4 shows one of the casing parts of the previous figures, on its own.

DETAILED DESCRIPTION OF THE ILLUSTRATED EMBODIMENT

Figure 1:
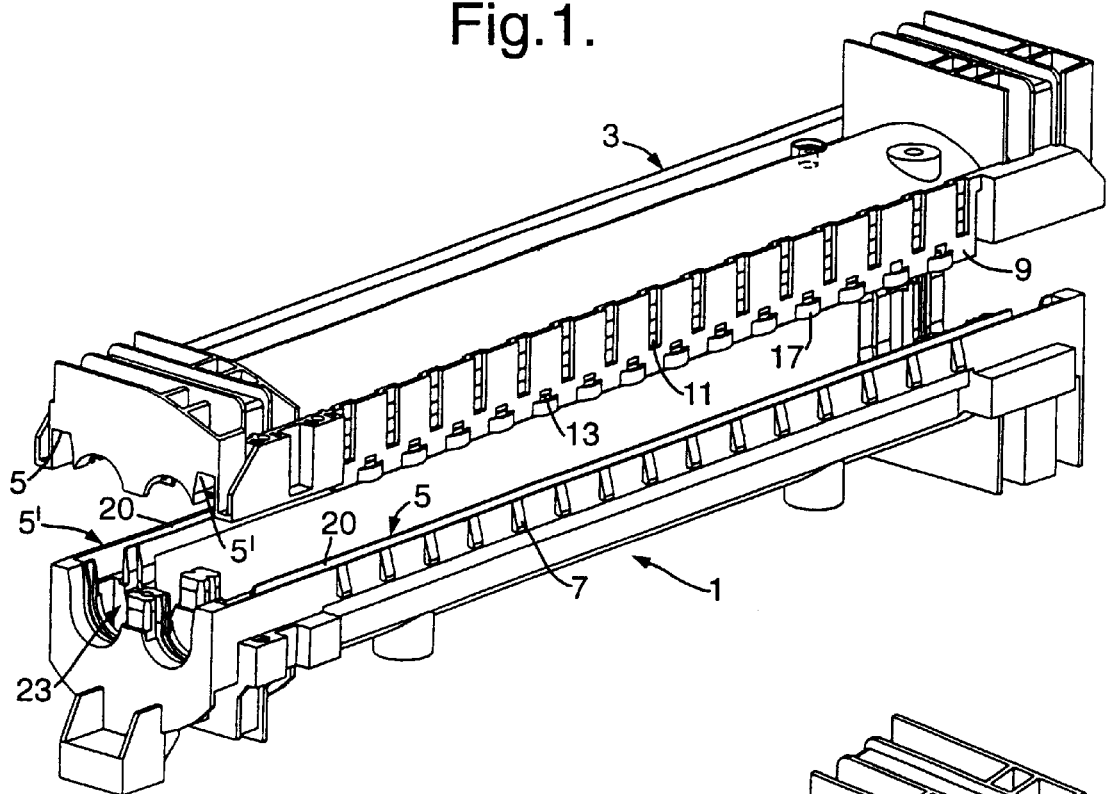
FIG. 1 shows two separated casing parts of a closure according to the invention.
Figure 2:
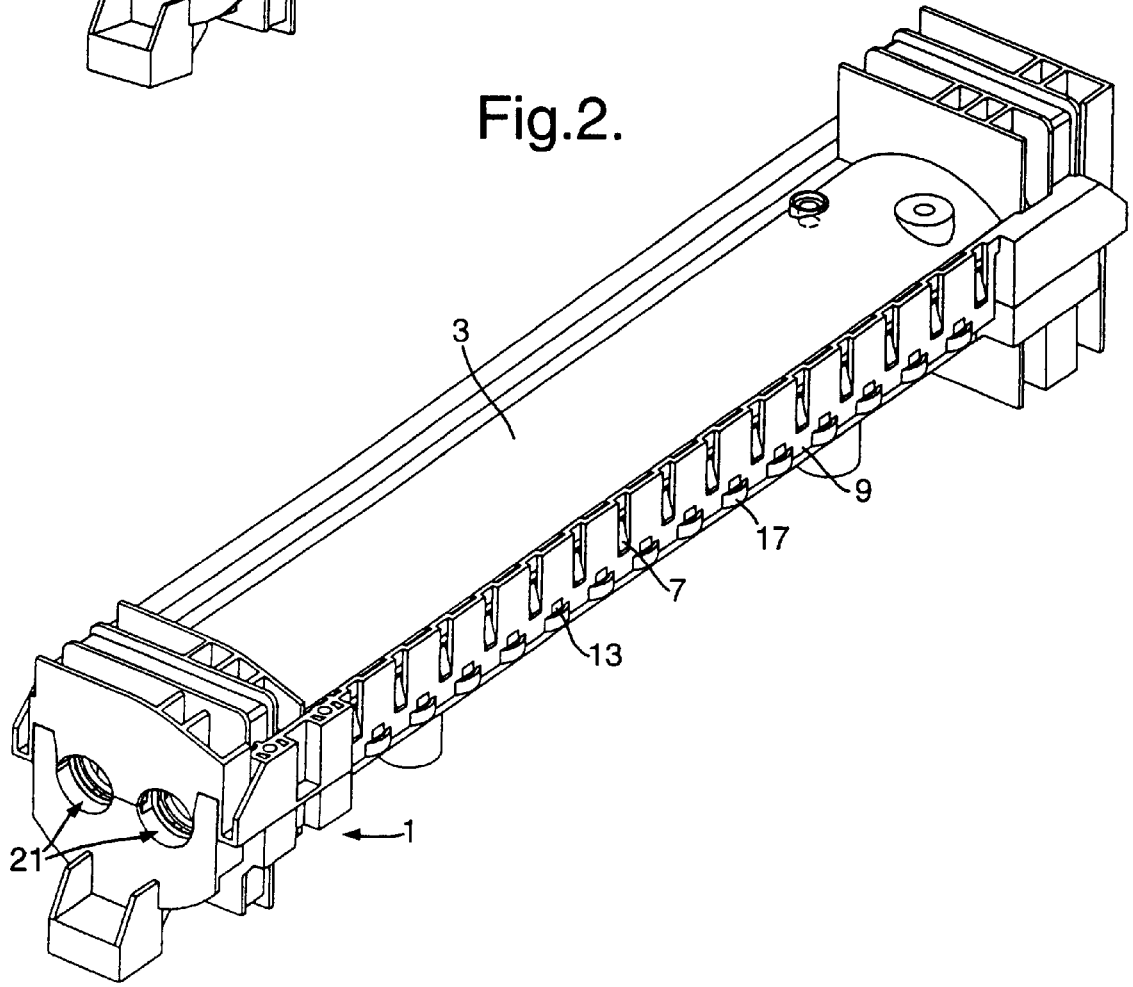
FIG. 2 shows the casing parts of FIG. 1 fastened together.
Figure 3:
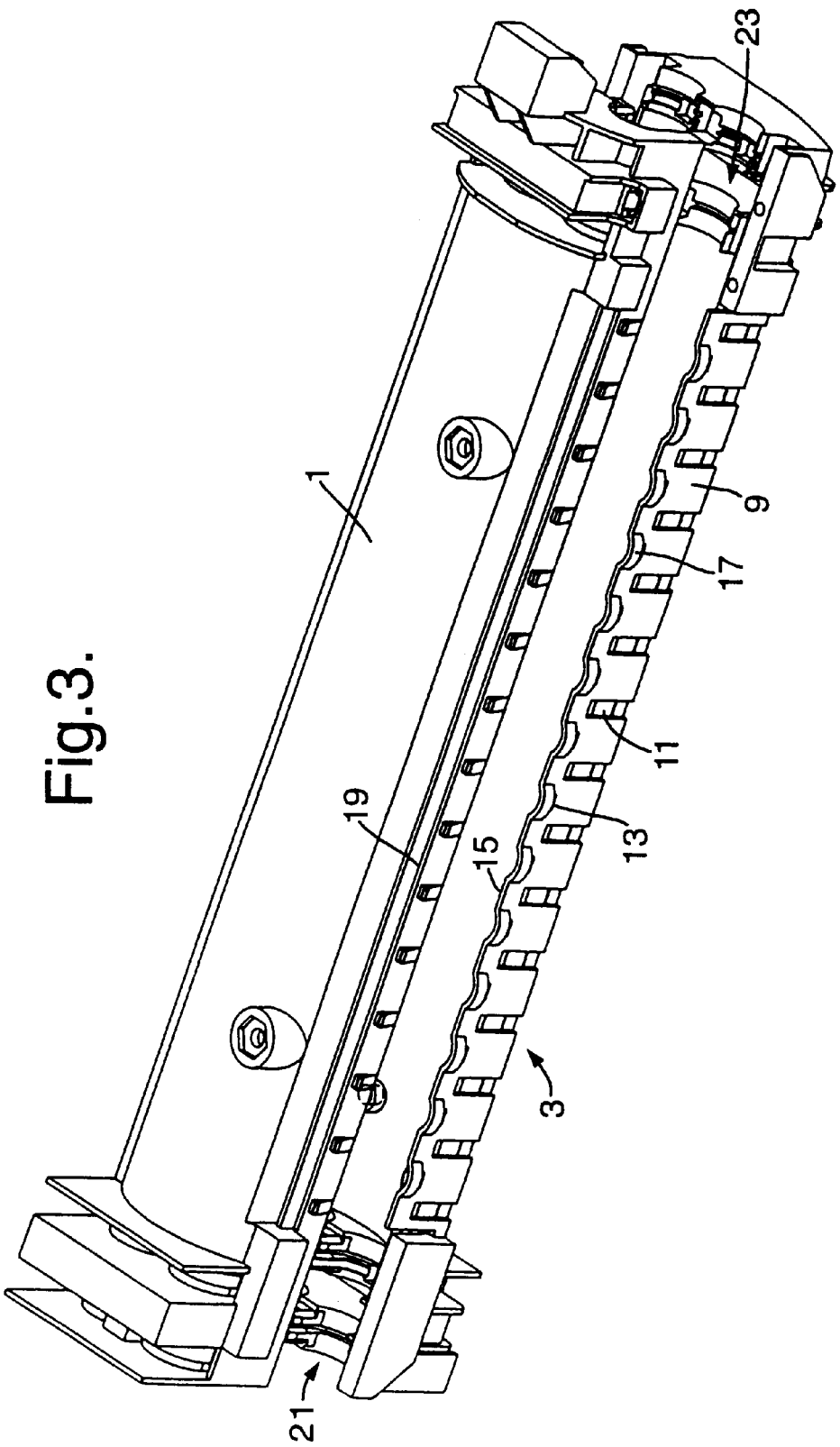
FIG. 3 shows an underside view of the casing parts of FIG. 1.

FIG. 1 shows a cable splice closure according to the invention, comprising a first casing part 1 and a second casing part 3, each of which is in the form of a half-shell. The closure has two pairs of opposing (longitudinal) edges 5 and 5' which may be brought together to closure the closure (as shown in FIG. 2). The first casing part has a series of ramp- or wedge-shaped protrusions 7 extending along the exterior of the first casing part adjacent to each edge 5. The second casing part 3 has two extending walls 9, each of which is adjacent to a respective edge 5' and extends towards the first casing part 1. Each extending wall 9 has a series of openings 11 in it. As shown in FIG. 2, when the closure is closed, each pair of opposing edges 5 and 5' is brought together, and each extending wall 9 overlaps the exterior of the first part 1 of the closure, with the ramp-shaped or wedge-shaped protrusions 7 in engagement with respective openings 11.

Each extending wall 9 also includes a series of apertures 13 extending completely through the extending wall from its exterior surface to its interior surface. As is most clearly shown in FIG. 4, each aperture 13 also comprises a recess in the interior surface of the extending wall 9, which recess is open to the front edge 15 of the extending wall. This recessing is achieved by means of the curved portions 17 of each extending wall, but other designs could be used to produce a similar feature. (In FIG. 4, only one of the extending walls has the details of openings 11, apertures 13, and curved portions 17 illustrated).

The first casing part 1 has a shoulder 19 extending along its exterior, which is arranged such that it may be engaged by a lever (e.g. a screw driver etc.) inserted into an aperture 13, in order to force the two casing parts together, and in particular to cause a protrusion 7 to interlock with a respective opening 11. In this way, each protrusion 7 may be caused to engage its respective opening 11 by inserting the lever into each of the apertures, or selected apertures, in turn, and forcing the first and second casing parts towards each other.

When it is necessary to open the closure, the screw driver or other lever may be inserted into each of the apertures 13 through the open end of the recess in the front edge 15 of the extending wall 9, in order to force the extending wall 15 laterally away from the first casing part, thereby causing each protrusion 7 to become disengaged from its respective opening 11.

Each edge 5 of the first casing part 1 contains a longitudinal groove 20 for containing a sealing member which seals between the opposing edges 5, 5'. When a resilient sealing member is used, its resilience will normally assist the separation of the first and second casing parts by forcing them apart when the lever disengages the protrusions from the openings.

Also illustrated in the drawings are cable ports 21 and cavities 23 in the ends of the casing parts for containing sealant (e.g. gel sealant) to seal around the cables.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A cable splice closure, comprising first and second casing parts, each having an edge providing first opposing edges which may be brought together to close the closure, a series of protrusions extending along an exterior surface of the first casing part adjacent to said edge of the first casing part, and a series of openings extending adjacent to said edge of the second casing part in an extending wall, the openings having a closed portion adjacent said edge of the second casing part, the openings, when the closure is closed, overlapping the exterior of the first casing part such that each protrusion is resiliently interlocked with a respective opening by the closed portion of the respective openings so as to restrain movement of the first casing part away from the second casing part, the second casing part further including a plurality of apertures in its extending wall configured to receive a lever to force the casing parts together such that the respective protrusions and openings interlock and to force the casing parts apart such that the respective protrusions and openings disengage.

2. A closure according to claim 1, in which each aperture extends completely through the extending wall from an exterior surface to an interior surface thereof, thereby permitting said lever to be inserted through the aperture from the exterior surface of the wall and into engagement with the exterior of the first casing part, in order to force the casing parts together.

3. A closure according to claim 2, in which the exterior surface of the first casing part includes at least one shoulder positioned to be engaged by said lever received in said aperture when the first and second casing parts are being forced together.

4. A closure according to claim 1, in which each aperture further comprises, a recess in an interior surface of the extending wall which recess is open to a front edge of the extending wall, thereby permitting said lever to be inserted between the extending wall and the exterior of the first casing part, in order to disengage respective said protrusions and openings when they are interlocked in use.

5. A closure according to claim 1, in which each aperture is positioned between at least one respective said opening in the extending wall and a front edge of the wall.

6. A closure according to claim 1, in which each aperture is positioned between a respective pair of said openings in the extending wall.

7. A closure according to claim 1, in which the first and second casing parts are completely separable from one another.

8. A closure according to claim 7, wherein said first and said second casing each further have a second edge portion providing second opposing edges, the first and second opposing edges extending in a direction substantially parallel to a direction in which cables extend into the closure in use.

9. A closure according to claim 1, in which the first and second casing parts are hinged together.

10. A closure according to claim 9, wherein the opposing edges extend in a direction substantially parallel to a direction in which cables extend into the closure in use.

11. A closure according to claim 1, in which the first and second casing parts comprise half-shells.

12. A closure according to claim 1, in which the opposing edges are sealed, in use, by means of at least one resilient sealing member which facilitates the opening of the closure by pushing the two casing parts apart as the protrusions and openings are disengaged from each other.

13. A cable splice closure, comprising:
a first casing part having a laterally extending edge portion and a plurality of protrusions extending from an exterior surface of the first casing part adjacent to the edge portion of the first casing part;
a second casing part having a laterally extending edge portion and a plurality of openings extending through an exterior wall portion of the second casing part adjacent to the edge portion of the second casing part, the openings having a closed portion adjacent the edge portion of the second casing part, the second casing part further comprising a plurality of apertures in the exterior wall portion; and
the first and second casing portion having a closed position in which the exterior wall portion overlaps the first casing part and the plurality of protrusions resiliently interlocks with respective ones of the plurality of openings and an open position and wherein the apertures are configured to receive a lever so as to move the first and second casing portion between the closed position and the open position.

14. A closure according to claim 13 wherein the apertures are positioned along a laterally extending edge portion of the exterior wall and wherein the apertures extend completely through the exterior wall portion from an exterior surface to an interior surface thereof to permit the lever to be inserted through the aperture and into engagement with the first casing portion.

15. A closure according to claim 14 wherein the apertures comprise a recess which is open to the laterally extending edge portion of the exterior wall.

16. A closure according to claim 15 wherein the laterally extending edge portion of the exterior wall extends in a first direction and the apertures extend along the exterior wall in a direction transverse to the first direction so as to allow a lever inserted in one of the apertures to engage the first casing part.

17. A closure according to claim 16 wherein the first casing part further comprises a shoulder positioned to be engaged by a lever inserted in one of the apertures.

18. A closure according to claim 14 wherein the laterally extending edge portions of the first and second casing parts and of the exterior wall extend in a direction substantially parallel to a direction in which cables extend into the closure.

19. A closure according to claim 13 further comprising a resilient sealing member positioned between the laterally extending edge portions of the first and second casing parts in the closed position.

20. A closure according to claim 19 wherein the resilient sealing member is positioned so as to facilitate movement from the closed position to the open position by pushing the first and second casing parts apart.

21. A cable splice closure, comprising first and second casing parts, each having an edge providing opposing edges which may be brought together to close the closure, a series of protrusions extending along an exterior surface of the first casing part adjacent to said edge of the first casing part, and a series of openings extending adjacent to said edge of the second casing part in an extending wall which, when the closure is closed, overlaps the exterior of the first casing part such that each protrusion is resiliently interlocked with a respective opening, the second casing part further including a plurality of apertures in its extending wall configured to receive a lever to force the casing parts together such that the respective protrusions and openings interlock and to force the casing parts apart such that the respective protrusions and openings disengage, wherein each aperture extends completely through the extending wall from an exterior surface to an interior surface thereof, thereby permitting said lever to be inserted through the aperture from the exterior surface of the wall and into engagement with the exterior of the first casing part, in order to force the casing parts together.

22. A cable splice closure, comprising:

a first casing part having a laterally extending edge portion and a plurality of protrusions extending from an exterior surface of the first casing part adjacent to the edge portion of the first casing part;

a second casing part having a laterally extending edge portion and a plurality of openings extending through an exterior wall portion of the second casing part adjacent to the edge portion of the second casing part and a plurality of apertures in the exterior wall portion;

the first and second casing portion having a closed position in which the exterior wall portion overlaps the first casing part and the plurality of protrusions resiliently interlocks with respective ones of the plurality of openings and an open position and wherein the apertures are configured to receive a lever so as to move the first and second casing portion between the closed position and the open position; and wherein the apertures extend completely through the exterior wall portion from an exterior surface to an interior surface thereof to permit the lever to be inserted through the aperture and into engagement with the first casing portion.

* * * * *